Patented June 6, 1944

2,350,525

UNITED STATES PATENT OFFICE 2,350,525

MANUFACTURE OF PIGMENTS AND COATING COMPOSITIONS

Grady M. O'Neal, Chicago, Ill., assignor to The Sherwin-Williams Company, Cleveland, Ohio, a corporation of Ohio No Drawing. Application March 17, 1943, Serial No. 479,498

38 Claims. (Cl. 106—219)

The present invention relates in general to improved pigment masses and coating compositions made therefrom. In particular, it relates to azo pigment dyestuffs of both the salt and non-salt forms and to their use in coating compositions.

It is an object of the present invention to produce azo pigment dyestuff compositions, of both salt form and non-salt form of the pigment dyestuff, which have properties not exhibited by the azo pigment dyestuff per se.

It is a particular object of the invention to produce such azo pigment dyestuff compositions containing water-insoluble metallic soap derived in part from rosinic acid and in part from fatty type acid.

It is also an object of the invention to produce such azo pigment dyestuff compositions containing a water-insoluble metallic soap of rosinic acid and independent thereof, or physically or chemically combined therewith, water-insoluble metallic soap of fatty type acid.

It is a further object of this invention to produce improved coating compositions, such as inks, paints, enamels, and the like, from the said improved pigment-soap compositions.

In my cofiled application, Serial No. 479,493, I have disclosed and claimed a generic invention based upon the discovery that water-insoluble rosinic-fatty type acid metallic soaps possess new and valuable properties useful in the treatment of azo pigment dyestuffs. In my cofiled applications, Serial Nos. 479,493 and 479,496, I have disclosed and claimed two wet processes by means of which the said generic invention can be advantageously employed to produce azo pigment dyestuffs of the non-lake type and the lake type. While the two wet processes of the last mentioned applications are of great value and demonstrate outstanding advantages in certain pigment manufacturing operations, they possess a number of characteristics which tend to limit their fields of usefulness. Neither of these procedures is readily applicable to treating the alkali-metal salt forms of azo pigment dyestuffs. Also, the processing operations involved in these procedures include additional steps over those required in normal prior art pigment manufacturing operations and involve steps which, in certain applications, are undesirably complex.

The present invention aims to supplement the said wet processes to achieve the same ultimate goals, and in so doing the present invention is applicable to the same types of azo pigment dyestuffs as are the said wet processes, as well as to new ones which are not suitable for practice of the wet processes of the above mentioned cofiled applications. The present invention also aims to adapt new materials for use in old processes of making coating compositions, whereby new advantages accrue in the manufacture and in the use of the resulting coating compositions. It also aims to make these same improvements applicable to the treatment of any powdered azo pigment dyestuff, including alkali-metal salt forms of azo pigment dyestuffs, all by a mere physical incorporation of certain specific types of soap powders with the powder form of the pigment to be treated.

In my earlier copending application, Serial No. 348,688, filed July 31, 1940, it is disclosed that improvements are obtained in the quality and performance of compositions made by mixing certain soap powders with alkali-metal salt forms of azo pigment dyestuffs. My subsequent investigations have also disclosed that the same and still further advantages result from the use of the present invention in preparing azo pigment dyestuff compositions other than the alkali-metal salt forms, which further improvements cannot readily be obtained by the procedures of the above mentioned wet processes. It is not claimed that the process of the present invention is universally superior to the two wet processes in the fields where both are useful, but, within its own sphere of utility, it possesses definite advantages which cannot readily be secured by the said wet processes. In treating pigments of the types for which the wet procedures are especially adapted, the present invention is capable of producing products which are much improved over those obtainable by using the powdered soaps heretofore available. In such instances, however, it does not generally produce results comparable to those obtained by the wet processes, its advantages residing largely in the greater simplicity of the dry process.

As indicated by the foregoing discussion, it is a further object of this invention to adapt the generic invention, upon which my application, Serial No. 479,493, is based, to the procedure of physically associating a soap powder with an azo pigment dyestuff powder, while obtaining to the greatest degree possible the newly discovered advantages resulting from the use of water-insoluble rosinic-fatty-type acid, metallic soaps in other types of processes.

Various other and ancillary objects and advantages of the invention will be apparent from the following detailed description thereof.

It has been found that, in general, the dry, water-insoluble, metallic salt forms of fatty type acid soaps are grease-like materials entirely unsuitable for incorporation, or mixing, with dry azo pigment dyestuff powders.

In my cofiled application, Serial No. 479,494, I have disclosed and claimed a generic invention based on the discovery that certain specific water-insoluble metallic soap powders of rosinic acid and of fatty type acid possess new and valuable properties for improving azo pigment dyestuffs, the coating compositions made therefrom, and the processes of making such pigments and coating compositions. A specific embodiment of this general invention is disclosed in my cofiled application, Serial No. 479,499.

The characteristics of water-insoluble, metallic, fatty type acid soaps are discussed in my cofiled application, Serial No. 479,494, and the invention of that application is directed to the manufacture of free-flowing, dry, powdered mixtures of water-insoluble metallic soaps of rosinic acid and of fatty type acid by procedures which will avoid the undesirable greasiness of the final product. Those soaps are particularly well adapted for use in the present invention.

For detailed information as to the preferred methods of making the said special soaps, and as to the many possible useful variations of these soaps, reference is made to my cofiled applications, Serial No. 479,494, and Serial No. 479,499.

The preferred manner in which the above-mentioned special soaps of said applications, Serial Nos. 479,494 and 479,499, are used to carry out the present invention will best be understood by considering the following specific examples, which are directed both to the preparation of a few representative soaps useful in carrying out the invention and to the treatment of azo pigment dyestuffs therewith. In these examples all parts are given by weight.

Soap No. 1

To an agitated solution at 90° C. produced from 450 parts of water, 9.0 parts of oleic acid, as the sodium salt in a 10% solution in water, and 9.0 parts of the condensation product of about 1 part of maleic anhydride and 6.8 parts of E wood rosin, as the sodium salt in a 10% solution in water, add 10.5 parts of barium chloride ($BaCl_2.2H_2O$) dissolved in 200 parts of water. After 15 minutes agitation, while having attained or maintained a temperature of 90° C., filter off the resulting water-insoluble metallic soap product. Thoroughly wash, dry, and grind to a powder.

Soap No. 2

To an agitated solution at 90° C. produced from 450 parts of water and 18.0 parts of a maleic acid-rosin condensation product (see Soap No. 1), as the sodium salt in a 10% solution in water, add 10.5 parts of barium chloride ($BaCl_2.2H_2O$) in 200 parts of water. Agitate for 15 minutes, while having maintained the temperature at 90° C.; then filter, thoroughly wash, dry, and grind to a powder.

Soap No. 3

To an agitated solution at 90° C. produced from 450 parts of water; 6.0 parts of WW wood rosin, as the sodium salt in a 10% solution in water; 6.0 parts of the condensation product of about 1 part of maleic anhydride and 6.8 parts of E wood rosin, as the sodium salt in a 10% solution in water; and 6.0 parts of crude naphthenic acids, as the sodium salts in a 10% solution in water, add 10.5 parts of barium chloride ($BaCl_2.2H_2O$) dissolved in 200 parts of water. After 15 minutes agitation, while having maintained the temperature at 90° C., filter off the resulting water-insoluble metallic soap. Wash free of salt electrolyte, dry, and grind to a powder.

The above Soap No. 3 is an example of a water-insoluble metallic soap derived from rosin, a chemical derivative of rosin, and naphthenic acids. It is a white, pulverulent, non-greasy powder, and may be used for blending with azo pigment dyestuffs to give new and improved properties for coating compositions.

The proportion of fatty type acid to rosinic acid in the resinic-fatty type acid, metallic soaps used in carrying out my invention may vary over a wide range, and variations in it are not appreciably noticeable unless a very small amount of the combined soaps is used. It is more the proportions of rosinic acid soap to pigment, and of fatty type acid soap to pigment, which are controlling. Considering that the mixed soap may be advantageously used in quantity up to 10 parts of soap to 10 parts of pigment, a wide variety of proportions of both fatty type acid and rosinic acid to pigment are permitted in so far as the improvements in the inks or coating compositions are concerned. However, the extent to which the rosinic acid soap and the fatty type acid soap may be present in a combination soap will determine the character of the soap product. In making soap masses varying from 100% of rosinic acid soap to 100% of fatty type acid soap, it has been found generally that, as the fatty type acid content of the soap increases to over about 65% of the total of the two soap-forming acids, the soap becomes greasier and less powdery. When it attains a content of about 85% fatty type acid, the mixed soap combination is so greasy that it cannot be well mixed with a pigment to form a free-flowing powder. Also, the content of the rosinic acid becomes so low that the functional effect of it to improve the ink-making process and the resulting ink begins to be reduced. However, it is not indicated that from 65% to 85% of the acid content of the soap may not be the fatty type acid. For obtaining a free-flowing powder, it is preferred that the fatty type acid content of the soap be in the neighborhood of 50%, and for the ultimate purposes of improving inks and coating compositions, it is preferred that the fatty type acid content of the soap be not over 80% where at least 20% is the rosinic acid.

Although the above limitations are given in terms of soap-forming acid, they are applicable in a general sense to the respective soap contents, because there is not a sharp line of division with respect to these limitations. The resulting greasiness, to a degree, varies also with the metal of the soap and with the nature of the rosinic acid used in the soap when using a low concentration of rosinic acid soap. The lower limit of 20% rosinic acid content is, therefore, an average limitation prescribed as a safe margin for practice of the invention.

The more common salt forms of azo pigment dyestuffs are those of the alkali-earth metals and various other metals which form salts that are less soluble than the alkali metal salts. Nevertheless, desirable features and color characteristics are provided by certain alkali-metal salts; and hence, the sodium salts are of value. There are highly objectionable features, however, to such sodium salt pigments. Compared to other simple azo pigment dyestuffs of both the salt and non-salt forms, they are more difficult to grind into ink vehicles and give poorer dispersions because of their more hydrophilic character. The inks have undesirable set-up tendencies and poor flow qualities.

It is not possible to overcome these defects by means applicable to salt-form pigment dyestuffs other than the alkali-metal salt forms, wherein the pigment in process is subjected to water in the treatment, for, in contact with water or moisture, they are reactive with certain compounds of metal in a base-exchange type of reaction whereby the sodium, for example, of a sodium salt pigment, is partially exchanged for other metal, for example, calcium, in the form of a calcium ion from any calcium compound associated with it. As a result, a different salt, such as a calcium salt compound, is formed in whole or in part which is of different color value. This calcium salt form, when in the presence of part of the original sodium salt pigment dyestuff, results in an azo pigment dyestuff mixture of two salt forms of different color value than the original sodium salt form.

The act of grinding a pigment into a vehicle, as in making ink, involves a diminution of particle size and a wetting action between the pigment and the vehicle. The sodium salt pigments possess poor wetting qualities with respect to the usual coating composition vehicles, resulting in difficult grinding and in poor dispersions. However, I have found that, when a suitable metallic soap is present, the soap serves as an intermediary or wetting agent for either the vehicle or the pigment, or for both. It is apparently held to the pigment particle, and seems to become a coating agent or surface altering agent for the pigment, bringing about more favorable action in grinding and resulting in better dispersions.

The following Examples 1, 2, and 3 illustrate a number of applications of the present invention to a few alkali-metal salt forms of azo pigment dyestuffs:

EXAMPLE 1

GRAPHIC RED PIGMENT—*The sodium salt of the coupling 2-naphthylamine-1-sulfonic acid with 2-naphthol. (Also called sodium lithol.) See Schultz, "Farbstofftabellen" (1931), No. 219.*—A pigment mass, composed of 21 parts of sodium lithol, prepared in the customary manner, is mixed into a No. 0 regular litho varnish (a bodied linseed oil) in the proportions of 1 part of pigment mass to 1 part of vehicle. The resulting paste is then ground to an ink on a 3-roll mill. This ink is designated "ink A."

A second ink is now prepared. This time, however, the pigment mass is composed of 20 parts of the sodium lithol used in ink A and 1 part of Soap No. 1. The pigment mass-vehicle ratio, the mixing, and grinding to an ink are identical with the procedure for ink A. The resulting ink is designated "ink B."

A comparison of the data obtained during and after the preparation of inks A and B shows the following comparative results:

*Grinding.*—The pigment mass used for ink B gives an ink of the same degree of pigment dispersion as ink A in approximately ⅓ less grinding time.

*Body softness and length.*—Ink B possesses what is known in the trade as excellent working properties, being soft in body and having the quality of flow, whereas ink A is short and buttery and does not possess this property of flow.

*Ink gloss and brilliance.*—When a comparative drawdown is made of ink A and ink B, it is seen that ink B possesses greater brilliance and gloss of ink film than ink A.

*Print-tone.*—Ink B possesses a bright, bronzeless print-tone, while ink A has the usual characteristic bronze.

*Set-up tendencies.*—When the two inks, A and B, are allowed to stand for a time, it is noticed that ink B does not body-up or set-up nearly as much as the normal sodium lithol inks, which are characterized by ink A.

EXAMPLE 2

LAKE RED C PIGMENT—*The sodium salt of the coupling of 2-chloro-5-toluidine-4-sulfonic acid with 2-naphthol. See Schultz, "Farbstofftabellen" (1931), No. 195.*—Mix 20 parts of the dry pigment with 0.6 part of Soap No. 1. When ground into an ink, as in Example 1, a comparison with a blank in which no soap has been incorporated shows resulting improvements of the same order and nature as those described in Example 1. In this instance, however, there is an increase in print-tone bronze instead of a decrease as in the preceding example, resulting from the presence of soap. This bronzeness is often desirable.

EXAMPLE 3

GRAPHIC RED PIGMENT.—20 parts of the sodium salt of Example 1, are mixed with 1 part of Soap No. 2. When comparative inks are prepared, the pigment-soap mass shows the same improvements as in Example 1.

It is to be understood that in the above Examples 1, 2, and 3, the pigments given may be used with either Soap No. 1, Soap No. 2, or Soap No. 3, and that other pigments which are salts other than alkali-metal salts of azo pigment dyestuffs may be substituted for the pigments of those examples, all with comparable improved results.

Discussion

In Example 1, if the pigment having no soap incorporated therewith is mixed with 1 part of blanc fixe (barium sulfate) as an inert diluent, inks made from the diluted pigment and the soap-treated pigment respectively are not at all comparable, showing that the improvements in Example 1 are due to the soap used therein.

Soap No. 2 has but one soap-forming acid therein, which is a condensation product of rosin with maleic anhydride. If this soap-forming acid is changed to rosin or hydrogenated rosin alone, the equivalent properties in the soap for the present invention do not obtain. This rosin-maleic acid condensation product, or its equivalent, contains the essential ingredients, and other unsaturated aliphatic acids (or anhydrides) may be substituted for the maleic anhydride. See my cofiled application, Serial No. 479,499, hereinbefore referred to.

EXAMPLE 4

MIXED GRAPHIC RED AND LAKE RED C PIGMENT— *The sodium salt of the coupling 2-naphthylamine-1-sulfonic acid with 2-naphthol, with the barium salt of the coupling 2-chloro-5-toluidine-4-sulfonic acid with 2-naphthol. See Schultz, cited in Examples 1 and 2.*—Twenty parts of a mixture composed of 12 parts of the sodium salt of graphic red pigment and 8 parts of the barium salt of a lake red C pigment are mixed with 1 part of the same dry powdered soap used in Examples 1 and 2 (Soap No. 1). When the same pigment-vehicle ratio and the same vehicle as in Examples 1 and 2 are used, improvements obtain which are of the same relative order, with respect to easier grinding, bettered flow, and improved working properties, when compared with a like pigment mixture containing no metallic soap.

This example illustrates the manufacture of a pigment possessing properties unlike either the graphic red or lake red C pigments alone. Due to the fact that a sizable proportion of the pigment is represented by a relatively insoluble alkali-metal salt-form of an azo pigment dyestuff, and also because such salts on contact with water or moisture, or in the presence of cation salts other than sodium, suffer a base-exchange reaction so that the sodium is exchanged for another metal, the pigment of this example may be prepared to better advantage by this process than by means of the wet processes.

EXAMPLE 5

GRAPHIC RED PIGMENT—*Barium salt of the coupling of 2-naphthylamine-1-sulfonic acid with 2-naphthol. See Schultz, cited in Example 1.*—A pigment composition is prepared by mixing 17 parts of the above graphic red pigment with 3 parts of Soap No. 3. This pigment mass then is incorporated into a No. 0 regular litho varnish in the ratio of 20 parts of pigment mass to 24 parts of vehicle in the customary manner to give an improved coating composition (an ink).

The grinding of this pigment mass into the vehicle is accomplished in a much shorter time than can be accomplished with the straight pigment when the same pigment-vehicle ratio is used. In addition, an ink of improved working properties and bettered lithographic breakdown resistance is secured.

The soap content of the above pigment mass is 15%; the pigment content, 85%.

This example illustrates an extension of the invention beyond what is involved in Examples 1 through 4, above, in regard to both the particular pigment salt form and the amount of soap employed. The soap content is increased, and a salt form of an azo pigment dyestuff, other than alkali metal, is used. Depending upon the desired properties, the proportions can be further varied, as can the nature of the azo pigment dyestuff; for example, a non-salt form of pigment may be substituted. It may be pointed out, however, that, as the amount of metallic soap powder in the pigment mass is increased, a correspondingly greater reduction in tinctorial strength occurs.

Coating compositions making use of the pigments and method of procedure of Examples 1 to 5 have been employed with other vehicles, for example, a paraffin-linseed oil vehicle of this nature:

| | Parts by weight |
|---|---|
| No. 0 Regular Litho Varnish | 1 |
| Paraffin oil of these characteristics: <br> a. No naphthenic base <br> b. 102 seconds viscosity at 100° F | 3 | and a mixing varnish of this composition:

| | Parts by weight |
|---|---|
| Ester gum | 100 lbs. |
| Oil (linseed 1 part; China-wood 2 parts) | 28 gals. } 67.5 |
| Mineral spirits solvent | 37.5 |

Improvement as to body, working properties, ease of grinding, and bettered wetting are as described earlier.

In my generic application, Serial No. 479,493, referred to above, mention has been made of the advantages of using salt electrolyte as defined and described therein. The incorporation of salt electrolyte in rosinic-fatty type acid soap powders is also illustrated in my cofiled application, Serial No. 479,494, referred to above. In the process of the present invention, use of salt electrolyte may be made, where desired, with still further improvements.

In preparing the soaps of the present invention, it is possible to precipitate the soap with a theoretical quantity of the selected precipitant salt, and then not wash, whereby the cation of the soluble soap and the anion of the precipitant salt combine to form salt electrolyte, which is retained by not washing. It has been found, however, that, where the presence of adhering or occluded salt electrolyte is advantageous, the same cation salt that serves as the precipitant can be employed in excess as a supplier of additional salt electrolyte. If desired, a theoretical amount of the precipitant salt may be employed and a salt electrolyte, foreign to either the precipitant salt or the products of the reaction, may be added. In general, it is preferred to use as precipitants salts of the group II metals—magnesium, calcium, strontium, and barium. It is possible, however, to use other cation salts, but in some instances, where the coating composition vehicle dries by an oxidation process, a number of the metallic salts or soaps tend to function as driers. Cation salts or soaps that have been found to function in this manner are those of iron, manganese, and lead.

The use of salt electrolyte where an alkali-metal salt form of azo pigment dyestuff is involved needs special consideration. To avoid a possible metal base-exchange in the said salt form, the salt electrolyte should have as cation only the cation of the said salt form of the pigment. Therefore, soap powder is preferably used from which salt electrolyte is washed out, if it has a cation not the same as that of the salt form. Where the alkali-metal salt form of the pigment is associated with salt electrolyte from its production, as is usually the case, no special addition of salt electrolyte is required, and the mere addition of washed soap powder results in a composition having both soap and salt electrolyte.

The nature and quantity of the salt electrolyte may vary widely when used with pigments other than the alkali-metal salt forms.

The term "salt electrolyte" comprehends generally those salts which are water-soluble and substantially neutral when ionized in aqueous solution, in particular, the water-soluble salts of the alkali and the alkali-earth metals. While salts of the strong mineral acids, such as hydrochloric and nitric, are most usually illustrated in the examples of the present invention, others have been employed, such as salts of sulfuric acid and salts of weak organic acids (formic, acetic, citric, oxalic, and others). Also, cations other than the alkali and alkali-earth metals have been employed as salts of a variety of acids, such cations being iron, lead, zinc, manganese, copper, and others. In general, the choice of the most efficient salt electrolyte for any particular application is best determined experimentally.

It has also been found that cation salts other than the alkali-metal type tend, in general, to react unfavorably in the presence of certain alkali-metal salt forms of azo pigment dyestuffs, as has been mentioned earlier in this specification. The most advantageous use of salt electrolyte in the soap powders, is, therefore, made with azo pigment dyestuffs other than the alkali-metal forms, unless alkali-metal salt is used as the salt electrolyte.

Salt electrolyte may be added to wet soap before drying, or it may be added in powdered form to the finished soap product, although such additions are not preferred.

Instead of associating the salt electrolyte with the soap powder, it may be associated with the pigment, preferably during the pigment formation, or, if desired, at any time prior to final drying of the pigment. For example, the soluble salt necessarily present after formation of the original strike of an azo pigment dyestuff may be retained with the pigment through the final recovery steps by omitting the customary washing step prior to drying. This salt electrolyte may be supplemented by the addition of more soluble salt at any time prior to final drying, or the originally present salt electrolyte may be removed by washing the pigment and the pigment treated with a solution of additional salt electrolyte, either before or after drying. Alternatively, part of the salt electrolyte may be associated with the dry pigment and part with the soap powder at the most convenient stages prior to mixing the latter with the former.

The use of salt electrolyte, in conjunction with the metallic soaps of this invention, produces a product of increased utility in the manufacture of various coating compositions. It is believed that the association of the salt electrolyte-soap combination with pigment, when the pigment is incorporated into a vehicle, gives a more favorable solid (pigment)-liquid (vehicle) interfacial relationship. As a result, improved wetting of the pigment by the vehicle and bettered dispersion are obtained. Also, in certain ink uses, greater emulsion inhibition is secured.

The scope of the term "soap" is not clearly defined in the technical literature, and the term is loosely and often improperly employed. The foregoing description of the present invention involves the use of certain special classes of soaps which I have chosen to identify as being respectively derived from "rosinic acid" and "fatty type acid." To further identify these soaps, it is also necessary to define the two classes of acids from which they are derived.

By the term "rosinic acid," as used in describing this invention, I intend to include rosin and abietic acid; modifications of rosin, such as heat-modified rosin and solvent-extracted rosin; chemical derivatives of rosin, such as hydrogenated rosin or abietic acid; the complex soap-forming acids resulting from the condensation product of rosin or abietic acid with unsaturated aliphatic acids having up to, but not more than, two carboxyl groups as described hereinafter; and other chemical derivatives of rosin or abietic acid. A special class of these chemical derivatives of rosin is covered in my cofiled application, Serial No. 479,499, wherein unsaturated aliphatic acids (including their anhydrides and their esters) containing up to, but not more than, two carboxyl groups are condensed with rosin by means of a diene or polymerization-condensation type of synthesis. In that application it has been shown that the procedural route for obtaining these desired complex acids is capable of wide variation. In one example, a typical ethylene dicarboxylic acid, in the form of its anhydride, is condensed with rosin to give the complex soap-forming acid directly. In a second example, a typical mixture of unsaturated, long chain, aliphatic, monocarboxylic acids that are common in drying oils is condensed (the glyceride esters of these acids being employed in this instance) with rosin to give a condensation-polymer glyceride ester, this ester being then saponified with alkali to give the desired complex soap-forming acids. It is possible to use other ester forms of these unsaturated aliphatic acids in effecting their condensation with rosin or abietic acid, and it is not necessary that these esters be those of unsaturated, long chain, aliphatic, monocarboxylic acids. For example, it is possible to form the identical maleic acid-abietic acid condensation product obtained by reacting maleic anhydride with abietic acid by condensing, instead, the dimethyl ester of maleic acid with abietic acid to give the ester adduct, and then subsequently saponifying the ester adduct with alkali. All of this is well known. In the case of linseed oil, which was employed in the second example just referred to, and which is illustrative of the driyng oils, two unsaturated aliphatic acids are mainly present— linolic or 9:12-octadecadienoic acid, and linolenic or 9:12:15-octadecatrienoic acid. Linolic acid is an unsaturated, monocarboxylic acid of the general type, $C_nH_{2n-3}COOH$; and linolenic acid is an unsaturated monocarboxylic acid of the general type, $C_nH_{2n-5}COOH$. Hence it is seen that a large number of complex soap-forming acids capable of forming water-insoluble metallic soaps for the purposes of this invention, are available. All of these various types of simple and complex acids are contemplated by the use of the term "rosinic acid" in this specification and in claims which follow.

The term "fatty type acid," for the purposes of the present invention, contemplates: (1) the various $\alpha,\beta$-unsaturated aliphatic acids having up to, but not more than, two carboxyl groups, such as maleic acid, crotonic acid, actylene dicarboxylic acid, citraconic acid, and the like, which are capable of being condensed with rosin or abietic acid by the Diels-Alder reaction (described hereinafter, and also in more detail in my cofiled application Serial No. 479,499); (2) the saturated and unsaturated soap-forming aliphatic acids, which have at least 8 carbon atoms including a carboxyl group carbon in an open carbon chain, such as caprylic acid, ricinoleic acid, oleic acid, linolic acid, linolenic acid, palmitic acid, and the like; and (3) the soap-forming naphthenic acids, defined hereinafter, and others of a cycloaliphatic nature, each carboxyl group of which is attached to the cyclic carbon chain through at least one intermediate carbon atom so that each carboxyl group is part of an aliphatic side chain of at least two carbon atoms. By this last mentioned limitation, I intend to include in this third class of fatty type acids those cycloaliphatic compounds, such as naphthenic acids, in which the carboxyl group is part of an aliphatic radical having at least two carbon atoms (including the carboxyl group carbon) and is not attached directly to a carbon atom of a cyclic carbon chain, and to exclude and differentiate from such compounds as the "rosinic acids," defined above, in which the carbon atom of the carboxyl group of the rosin or abietic acid is attached directly to a carbon atom of a cyclic carbon chain.

It is well known that many of the fatty type acids in group (2) in the preceding paragraph, both saturated and unsaturated, are found as mixtures in vegetable oils and animal fats, principally in the form of glycerides. Among the vegetable oil acids which are useful in the present invention, for example, are those from the oils of Perilla seed, soya bean, sunflower seed, corn, rapeseed, and linseed. A typical analysis of Perilla oil acids, to illustrate one class, is as follows:

| Nature of acid: | Percentage |
|---|---|
| Oleic | 4.0–10.5 |
| Linolic | 33.0–44.0 |
| Linolenic | 44.0–49.0 |
| Palmitic (substantially) | 6.5– 8.0 |

Naphthenic acids are secured from petroleum during refining and are defined by "Richter's Organic Chemistry," vol. II (1939), p. 64, essentially as follows: They consist of saturated monocyclic acids of the general formula $C_nH_{2n-2}O_2$, which have been found to be alkylated carboxylic acids of the cyclopentane series up to $C_{12}H_{22}O_2$; two paraffin-carboxylic acids $C_6H_{12}O_2$ and $C_7H_{14}O_2$; and some bicyclic compounds of the general formula $C_nH_{2n-4}O_2$, ranging from $C_{13}H_{22}O_2$ to $C_{22}H_{40}O_2$.

The term "fatty type acid" includes in group (1) of the above definition certain short chain acids, such as maleic acid, which are not "soap-forming acids," as the latter term is generally understood. I wish to make it clear, therefore, that such acids, since they are not alone truly "soap-forming" when reacted to form a metal salt, are not contemplated by the expression "soap of a fatty type acid." However, they are "soap-forming" acids when chemically combined with rosin, and, therefore, they are intended to be included as members of the group of "fatty type acids" useful for the purposes of the present invention. When chemically combined with rosin and suitably reacted with a metal, they enter into the formation of soap which is both rosinic and fatty type acid in nature and which is embraced by the terms "rosinic-fatty type acid soap" and "soap of both a 'rosinic acid' and a 'fatty type acid.'"

The term "rosinic-fatty type acid" as used in connection with the present invention contemplates the inclusion of (a) a physical mixture of one or more rosinic acids with one or more soap-forming fatty type acids; (b) chemically combined rosinic acid and fatty type acid, such as the rosin-maleic acid condensation product herein described, which is a single compound which is both rosinic acid and fatty-type acid as defined in this specification; (c) mixtures of (b) with a soap-forming fatty-type acid; (d) mixtures of (b) with a rosinic acid; (e) mixtures of (b) with (a).

The various rosinic acids and the various fatty type acids embraced by the above definitions may be substituted for those given in the examples, in some instances with comparable results and in other instances to obtain variations thereof which depend upon the proportion of rosinic acid to fatty type acid, the particular fatty type acid and rosinic acid employed, and the metallic salt of the specific rosinic-fatty type acid combination.

In precipitating water-insoluble soaps with a common cation, that is, one which is more than monovalent, from a solution of two distinct soluble soaps of different soap-forming acids, it is to be appreciated that three types of water-insoluble metallic soap may result. There may be one in which there is only one of the two acids. There may be another in which there is only the other of the two acids. There may be a third which contains both of the two acids. In the accompanying claims, where water-insoluble soaps of fatty type acid and of rosinic acid are referred to, it is contemplated that such soaps may consist of all three of the possible types mentioned.

Many variations and modifications of my invention, as set forth in the specific examples herein, will occur to those skilled in the art. These variations and modifications are innumerable, and only a few specific examples can practically be given herein. The examples, therefore, are intended to be merely illustrative, and are not to be taken as limiting the scope of my invention.

This application is a continuation in part of my copending applications, Serial No. 348,688, filed July 31, 1940; Serial No. 348,690, filed July 31, 1940; and Serial Nos. 427,919 and 427,920, both filed January 23, 1942.

What I claim as my invention and desire to secure by Letters Patent is:

1. The process of making an azo pigment dyestuff composition, suitable for use in coating compositions, which comprises preparing an azo pigment dyestuff powder, separately preparing a water-insoluble, "rosinic-fatty type acid" metallic soap as a free-flowing powder, and physically mixing the two powders.

2. The process of making an azo pigment dyestuff composition, suitable for use in coating compositions, which comprises preparing an azo pigment dyestuff powder, separately preparing a water-insoluble, "rosinic-fatty type acid" metallic soap as a free-flowing powder, at least one of said powders having a small amount of salt electrolyte physically associated therewith, and physically mixing the pigment powder, the soap powder, and the salt electrolyte.

3. The process of making an azo pigment dyestuff composition, suitable for use in coating compositions, which comprises preparing an azo pigment dyestuff powder, separately preparing a free-flowing powdery soap mass of water-insoluble metallic soap of "rosinic acid" and water-insoluble metallic soap of "fatty type acid," there being at least 1 part of "rosinic acid" in soap form in said mass to 4 parts of "fatty type acid" in soap form, and physically mixing the pigment powder with the powdery soap mixture.

4. The process of making an azo pigment dyestuff composition, suitable for use in coating compositions, which comprises preparing an azo pigment dyestuff powder, separately preparing a free-flowing powdery soap mass of water-insoluble metallic soap of "rosinic acid" and water-insoluble metallic soap of "fatty type acid," said soap mass containing in soap form at least 1 part of "rosinic acid" to 4 parts of "fatty type acid," and at least one of said powders having a small amount of salt electrolyte physically associated therewith, and physically mixing the pigment powder, the soap mixture, and the salt electrolyte.

5. The process of making an azo pigment dyestuff composition, suitable for use in coating compositions, which comprises preparing an azo pigment dyestuff powder, separately preparing as a free-flowing powder a water-insoluble metallic soap of the condensation product of rosin with an unsaturated aliphatic acid having up to, but not more than, two carboxyl groups, and physically mixing the two powders.

6. The process of making an azo pigment dyestuff composition, suitable for use in coating compositions, which comprises preparing an azo pigment dyestuff powder, separately preparing as a free-flowing powder a water-insoluble metallic soap of the condensation product of rosin with an unsaturated aliphatic acid having up to, but not more than, two carboxyl groups, at least one of said powders having a small amount of salt electrolyte physically associated therewith, and physically mixing the pigment powder, the soap powder, and the salt electrolyte.

7. An azo pigment dyestuff composition, suitable for use in coating compositions, which comprises water-insoluble, "rosinic-fatty type acid" metallic soap in free-flowing powdered form and a separately prepared azo pigment dyestuff powder physically mixed therewith in dry form.

8. An azo pigment dyestuff composition, suitable for use in coating compositions, which comprises water-insoluble, "rosinic-fatty type acid" metallic soap in free-flowing powdered form, a separately prepared azo pigment dyestuff powder physically mixed therewith in dry form, and a small amount of salt electrolyte physically associated with the particles of said azo pigment dyestuff composition.

9. An azo pigment dyestuff composition, suitable for use in coating compositions, which comprises an azo pigment dyestuff powder, and physically mixed therewith in dry form a separately prepared, free-flowing, powdery, soap mass of water-insoluble metallic soap of "rosinic acid" and water-insoluble metallic soap of "fatty type acid," said soap mass containing in soap form at least 1 part of "rosinic acid" to 4 parts of fatty type acid.

10. An azo pigment dyestuff composition, suitable for use in coating compositions, which comprises a free-flowing powdery soap mass of water-insoluble metallic soap of "rosinic acid" and water-insoluble metallic soap of "fatty type acid," a separately prepared azo pigment dyestuff powder, and a small amount of salt electrolyte, said soap composition containing at least 1 part of "rosinic acid" to 4 parts of fatty type acid, the soap mass and the azo pigment dyestuff having been physically mixed with each other in dry form, and the salt electrolyte having been physically associated with at least one of the other named ingredients of the mixture prior to mixing them with each other.

11. An azo pigment dyestuff composition, suitable for use in coating compositions, which comprises an azo pigment dyestuff powder physically mixed in dry form with a separately prepared free-flowing, powdered, water-insoluble, metallic soap of the condensation product of rosin with an unsaturated aliphatic acid having up to, but not more than, two carboxyl groups.

12. An azo pigment dyestuff composition, suitable for use in coating compositions, which comprises an azo pigment dyestuff powder physically mixed in dry form with a separately prepared free-flowing, powdered, water-insoluble, metallic soap of the condensation product of rosin with an unsaturated aliphatic acid having up to, but not more than, two carboxyl groups, and a small amount of salt electrolyte physically associated with said mixture.

13. An azo pigment dyestuff composition, suitable for use in coating compositions, which comprises an azo pigment dyestuff powder physically mixed in dry form with a separately prepared, free-flowing, powdery soap mass of water-insoluble metallic soap of "rosinic acid" and water-insoluble metallic soap of naphthenic acids, said soap mass containing at least 1 part of "rosinic acid" to 4 parts of naphthenic acids.

14. The process of making a coating composition which comprises preparing an azo pigment dyestuff powder, separately preparing a water-insoluble, "rosinic-fatty type acid" metallic soap in free-flowing powdered form, and incorporating said powders together into a non-aqueous liquid vehicle.

15. The process of making a coating composition which comprises preparing an azo pigment dyestuff powder, separately preparing a water-insoluble, "rosinic-fatty type acid" metallic soap as a free-flowing powder, at least one of said powders having a small amount of salt electrolyte associated therewith and carried thereby, and incorporating said powders with the carried salt electrolyte together into a non-aqueous liquid vehicle.

16. The process of making a coating composition which comprises preparing an azo pigment dyestuff powder, separately preparing as a free-flowing powder a soap mass of water-insoluble metallic soap of "rosinic acid" and water-insoluble metallic soap of "fatty type acid," said soap mass being derived from at least two soap forming acids in the proportion of at least 1 part of "rosinic acid" to 4 parts of "fatty type acid," and incorporating said powders together into a non-aqueous liquid vehicle.

17. The process of making a coating composition which comprises preparing an azo pigment dyestuff powder, separately preparing as a free-flowing powder a soap mass of water-insoluble metallic soap of "rosinic acid" and water-insoluble metallic soap of "fatty type acid," said soap mass being derived from at least two soap-forming acids in the proportion of at least 1 part of "rosinic acid" to 4 parts of "fatty type acid," at least one of said powders having a small amount of salt electrolyte associated therewith and carried thereby, and incorporating said powders with the carried salt electrolyte together into a non-aqueous liquid vehicle.

18. The process of making a coating composition which comprises preparing an azo pigment dyestuff powder, separately preparing a free-flowing, powdered, water-insoluble, metallic soap of the condensation product of rosin with an unsaturated aliphatic acid having up to, but not more than, two carboxyl groups, and incorporating the pigment powder and the soap powder together into a non-aqueous liquid vehicle.

19. The process of making a coating composition which comprises preparing an azo pigment dyestuff powder, separately preparing a free-flowing, powdered, water-insoluble, metallic soap of the condensation product of rosin with an unsaturated aliphatic acid having up to, but not more than, two carboxyl groups, at least one of said powders having a small amount of salt electrolyte associated therewith and carried thereby, and incorporating said powders and the carried salt electrolyte together into a non-aqueous liquid vehicle.

20. A coating composition comprising the product of incorporating a water-insoluble, "rosinic-fatty type acid" metallic soap in free-flowing powder form and a separately prepared azo pigment dyestuff in powder form into a non-aqueous liquid vehicle.

21. A coating composition comprising the product of incorporating water-insoluble, "rosinic-fatty type acid," metallic soap in free-flowing powdered form, a separately prepared azo pigment dyestuff powder, and a small amount of salt electrolyte together into a non-aqueous liquid vehicle.

22. A coating composition comprising the product of incorporating a dry, free flowing powdery material containing water-insoluble metallic soap of "rosinic acid" and water-insoluble metallic soap of "fatty type acid" mixed in dry form with a separately prepared azo pigment dyestuff powder, into a nonaqueous liquid vehicle, said soaps being derived from at least two soap-forming acids in the proportion of at least 1 part of "rosinic acid" to 4 parts of "fatty type acid."

23. A coating composition comprising the product of incorporating a dry, free-flowing powdery material containing water-insoluble metallic soap of "rosinic acid" and water-insoluble metallic soap of fatty type acid mixed in dry form with a separately prepared azo pigment dyestuff, and a small amount of salt electrolyte, into a nonaqueous liquid vehicle, said soaps being derived from at least two soap-forming acids in the proportion of at least 1 part of "rosinic type acid" to 4 parts of fatty type acid.

24. A coating composition comprising the product of incorporating an azo pigment dyestuff powder physically mixed in dry form with a separately prepared, water-insoluble, metallic soap of the condensation product of rosin with an unsaturated aliphatic acid having up to, but not more than, two carboxyl groups, into a non-aqueous liquid vehicle.

25. A coating composition comprising the product of incorporating an azo pigment dyestuff powder physically mixed in dry form with a separately prepared, water-insoluble, metallic soap of the condensation product of rosin with an unsaturated aliphatic acid having up to, but not more than, two carboxyl groups, and a small amount of salt electrolyte, into a non-aqueous liquid vehicle, said salt electrolyte having been physically associated with at least one of the other named ingredients of the powdery material prior to mixing them with each other.

26. A pigment composition comprising an alkali-metal salt-form of an azo pigment dyestuff mixed in dry form with a separately prepared water-insoluble "rosinic-fatty type acid" metallic soap.

27. A pigment composition comprising an alkali-metal salt-form of an azo pigment dyestuff mixed in dry form with a separately prepared water-insoluble "rosinic-fatty type acid" metallic soap, and having a small amount of salt electrolyte physically associated therewith.

28. The product of claim 9 in which the "rosinic acid" soap comprises soap of the complex soap-forming acid derived from the condensation of a member of the class consisting of rosin and abietic acid with a member of the class consisting of unsaturated aliphatic acids having up to, but not more than, two carboxyl groups.

29. The product of claim 9 in which the "rosinic acid" soap comprises soap of the complex soap-forming acid derived from the condensation of rosin with an unsaturated aliphatic acid having up to, but not more than, two carboxyl groups.

30. The product of claim 9 in which the "rosinic acid" soap comprises soap of the complex soap-forming acid derived from the condensation of rosin with maleic anhydride.

31. The product of claim 9 in which the "fatty type acid" soap comprises soap of an acid selected from the class consisting of saturated and unsaturated aliphatic acids having at least 8 carbon atoms and naphthenic acids.

32. The product of claim 9 in which the "fatty type acid" soap comprises soap of naphthenic acids.

33. The product of claim 9 in which the "rosinic acid" soap comprises soap of the complex soap-forming acid derived from the condensation of a member of the class consisting of rosin and abietic acid with a member of the class consisting of unsaturated aliphatic acids having up to, but not more than, two carboxyl groups, and the "fatty type acid" soap comprises soap of an acid selected from the class consisting of saturated and unsaturated aliphatic acids having at least 8 carbon atoms and naphthenic acids.

34. The product of claim 9 in which the "rosinic acid" soap comprises soap of the complex soap-forming acid derived from the condensation of a member of the class consisting of rosin and abietic acid with a member of the class consisting of unsaturated aliphtic acids having up to, but not more than, two carboxyl groups, and the "fatty type acid" soap comprises soap of naphthenic acids.

35. The product of claim 9 in which the "rosinic acid" soad comprises soap of the complex soap-forming acid derived from the condensation of rosin with maleic anhydride, and the "fatty type acid" soap comprises soap of an acid selected from the class consisting of saturated and unsaturated aliphatic acids having at least 8 carbon atoms and naphthenic acids.

36. The product of claim 9 in which the "rosinic acid" soap comprises soap of the complex soap-forming acid derived from the condensation of rosin with maleic anhydride, and the "fatty type acid" soap comprises soap of naphthenic acids.

37. The product of claim 9 in which the "rosinic acid" soap comprises soap of rosin and the "fatty type acid" soap comprises soap of an acid selected from the class consisting of saturated and unsaturated aliphatic acids having at least 8 carbon atoms and naphthenic acids.

38. The product of claim 9 in which the "rosinic acid" soap comprises soap of rosin and the "fatty type acid" soap comprises soap of nathhenic acids.

GRADY M. O'NEAL.

CERTIFICATE OF CORRECTION.

Patent No. 2,350,525. June 6, 1944.

GRADY M. O'NEAL.

It is hereby certified that error appears in the printed specification of the above numbered patent requiring correction as follows: Page 1, first column, line 32, for the serial number "479,493" read --479,495--; page 5, second column, line 25, for "driyng" read --drying--; page 7, first column, line 25, claim 7, strike out "tallic soap in free-flowing powdered form, a"; page 8, first column, line 25, claim 23, after "dyestuff" and before the comma insert --powder--; and that the said Letters Patent should be read with this correction therein that the same may conform to the record of the case in the Patent Office.

Signed and sealed this 5th day of September, A. D. 1944.

Leslie Frazer (Seal) Acting Commissioner of Patents.